United States Patent
Salter et al.

(10) Patent No.: US 9,694,741 B2
(45) Date of Patent: Jul. 4, 2017

(54) AMBIENT FUNCTIONAL LIGHTING OF A SEAT

(71) Applicant: Ford Global Technologies, LLC, Dearborn, MI (US)

(72) Inventors: Stuart C. Salter, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 14/467,073

(22) Filed: Aug. 25, 2014

(65) Prior Publication Data

US 2016/0052447 A1 Feb. 25, 2016

(51) Int. Cl.
*B60N 2/62* (2006.01)
*B60Q 3/02* (2006.01)
*B60Q 9/00* (2006.01)
*B60Q 3/233* (2017.01)
*B60Q 3/80* (2017.01)
(Continued)

(52) U.S. Cl.
CPC ........... *B60Q 3/0223* (2013.01); *B60N 2/449* (2013.01); *B60N 2/62* (2013.01); *B60Q 3/233* (2017.02); *B60Q 3/80* (2017.02); *B60Q 9/00* (2013.01); *A47C 7/725* (2013.01); *B60N 2002/4485* (2013.01)

(58) Field of Classification Search
CPC ............................... A47C 7/725; B60Q 3/0223
USPC ..... 362/483, 488, 131, 466, 464; 297/217.6, 297/312, 452.3, 217.3; 340/459
See application file for complete search history.

(56) References Cited

U.S. PATENT DOCUMENTS

| 2,958,369 A | 11/1960 | Pitts et al. |
| 3,403,938 A | 10/1968 | Cramer et al. |
| 3,929,374 A | 12/1975 | Hogan et al. |

(Continued)

FOREIGN PATENT DOCUMENTS

| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Syed A Islam
(74) *Attorney, Agent, or Firm* — Vichit Chea; Price Heneveld LLP

(57) ABSTRACT

A vehicle seating assembly includes a seat having a base including peripheral side ledges disposed on first and second sides of the seat. A seat cushion is disposed on the base and includes first and second independent thigh supports that extend forwardly over the base and define a forward ledge. A seatback is operably coupled to the seat and includes an upper portion and a lower portion. The lower portion includes a seatback cushion and a seatback support. A peripheral seatback cavity is located on first and second sides of the lower portion between the seatback cushion and the seatback support. At least one light source is disposed proximate the peripheral side ledges, the forward ledge, and the peripheral seatback cavity.

20 Claims, 7 Drawing Sheets

(51) Int. Cl.
*A47C 7/72* (2006.01)
*B60N 2/44* (2006.01)

(56) References Cited

U.S. PATENT DOCUMENTS

| | | | |
|---|---|---|---|
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A * | 9/1985 | Goldner | B60N 2/62 297/284.11 |
| 4,629,248 A | 12/1986 | Mawbey | |
| 4,720,141 A | 1/1988 | Sakamoto et al. | |
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,431,734 B1 | 8/2002 | Curry | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,131,756 B2 | 11/2006 | Leslie et al. | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,810,969 B2 | 10/2010 | Blackmore et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,007,043 B1 * | 8/2011 | Vuong | B60N 2/28 297/217.3 |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 2002/0145318 A1 * | 10/2002 | Asbach | B60N 2/2812 297/250.1 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2006/0181890 A1 * | 8/2006 | de Tavernier | B60Q 1/46 362/466 |
| 2007/0120401 A1 | 5/2007 | Minuth et al. | |
| 2008/0122241 A1 | 5/2008 | Blackmore et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |

(56) References Cited

U.S. PATENT DOCUMENTS

| | | |
|---|---|---|
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0343072 A1 | 12/2013 | Ehrmann et al. |
| 2015/0274068 A1* | 10/2015 | Falconi ............... B60Q 3/0223 297/217.6 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

Ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

\* cited by examiner

AMBIENT FUNCTIONAL LIGHTING OF A SEAT

FIELD OF THE DISCLOSURE

The present disclosure generally relates to a vehicle seat, and more particularly to ambient functional lighting of a vehicle seat.

BACKGROUND OF THE DISCLOSURE

A variety of lighting approaches are implemented in vehicles today. Such approaches can include ambient lighting in a vehicle for assisting an occupant in performing an action. Ambient lighting within vehicles is a popular feature offered by many vehicle manufacturers and current ambient vehicle lighting units are provided on various vehicle structures to enhance the driving experience. Current ambient vehicle lighting systems may have drawbacks, such as complicated construction, large packaging size, and the lack of a warning system in vehicle seats for critical driving conditions. Therefore, there is a need for ambient functional lighting in vehicle seats that is not hindered by the above-mentioned drawbacks.

SUMMARY OF THE DISCLOSURE

According to one aspect of the present disclosure, a vehicle seating assembly includes a seat having a base including peripheral side ledges disposed on first and second sides of the seat. A seat cushion is disposed on the base and includes first and second independent thigh supports that extend forwardly over the base and define a forward ledge. A seatback is operably coupled to the seat and includes an upper portion and a lower portion. The lower portion includes a seatback cushion and a seatback support. A peripheral seatback cavity is located on first and second sides of the lower portion between the seatback cushion and the seatback support. At least one light source is disposed proximate the peripheral side ledges, the forward ledge, and the peripheral seatback cavity.

According to another aspect of the present disclosure, a vehicle seating assembly includes a seat having a seat cushion and a base. The seat cushion and the base define a peripheral seat ledge disposed on first and second sides of the seat and a front of the seat. A seatback is operably coupled to the seat and includes a seatback cushion and a seatback support. A peripheral seatback cavity is located on first and second sides of the seatback and is defined between the seatback cushion and the seatback support. At least one light source is disposed proximate the peripheral seat ledge and the peripheral seatback cavity.

According to yet another aspect of the present disclosure, a vehicle seating assembly includes a seat defining a peripheral seat ledge disposed on first and second sides and a front of the seat. A seatback is operably coupled to the seat and includes a seatback cushion and a seatback support. A peripheral seatback cavity is defined between the seatback cushion and the seatback support. At least one light source is disposed on the peripheral seat ledge and in the peripheral seatback cavity.

In still another aspect of the present disclosure, a vehicle seating assembly includes an ambient seat lighting system configured to provide notices or alerts to a driver or passenger of a vehicle. The ambient seat lighting system includes a plurality of light sources disposed about the vehicle seating assembly, which are configured to illuminate to alert the driver or passenger, as well as to provide functional ambient lighting, depending on the desirability of the driver or passenger. The ambient seat lighting system provides a cost effective and reliable lighting system for use inside a vehicle.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
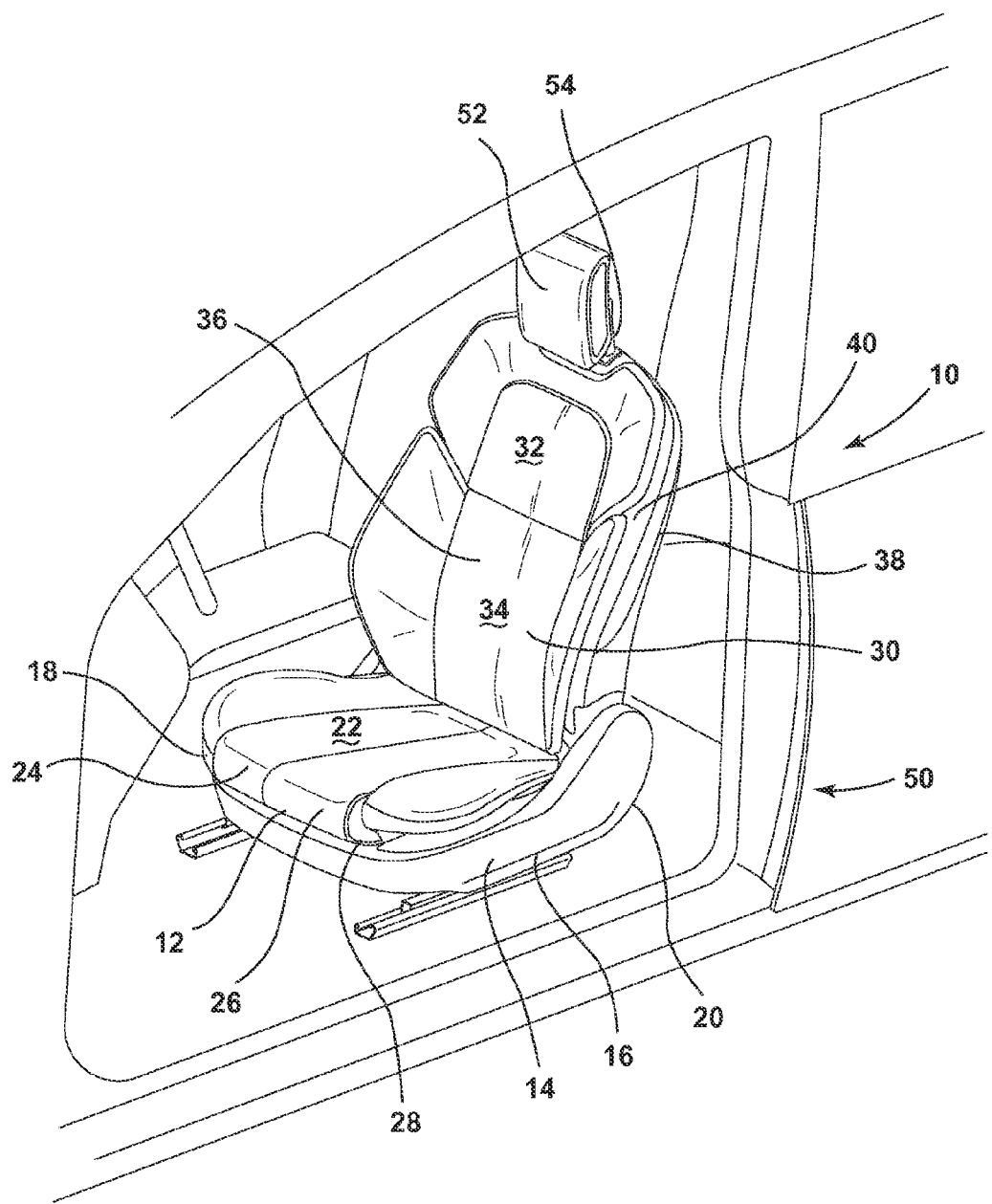
FIG. 1 is a front perspective view of a vehicle seating assembly of the present disclosure.
Figure 2:
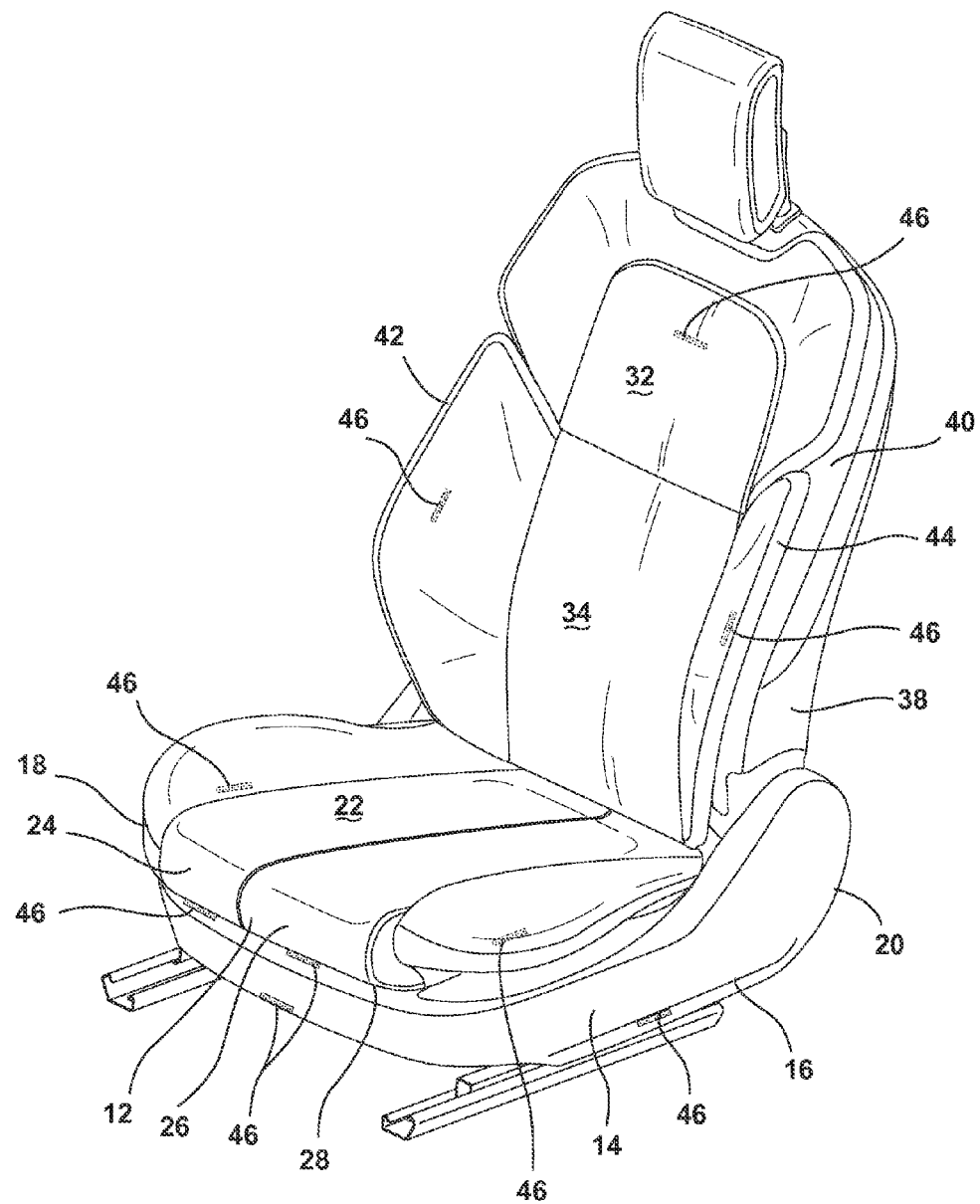
FIG. 2 is an enlarged front perspective view of the vehicle seating assembly of FIG. 1.
Figure 3:
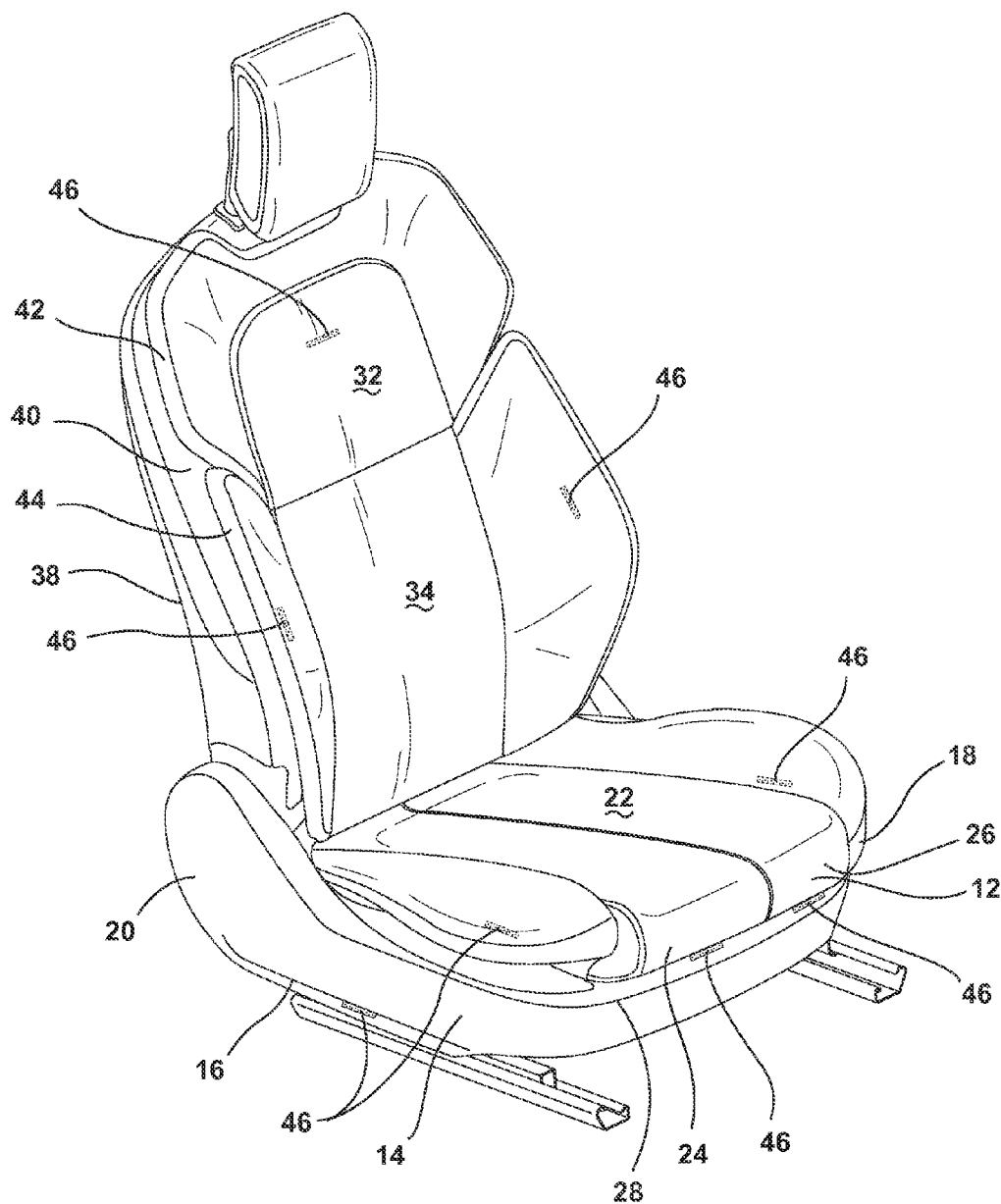
FIG. 3 is another enlarged front perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-7, reference numeral 10 generally designates a vehicle seating assembly that includes a seat 12 having a base 14 including peripheral side ledges 16 disposed on first and second sides 18, 20 of the seat 12. A seat cushion 22 is disposed on the base 14 and includes first and second independent thigh supports 24, 26 that extend forwardly over the base 14 and define a forward ledge 28. A seatback 30 is operably coupled to the seat 12 and includes an upper portion 32 and a lower portion 34. The upper and lower portions 32, 34 include a seatback cushion 36 and a seatback support 38. A peripheral seatback cavity 40 is located on first and second sides 42, 44 of the lower portion 34 between the seatback cushion 36 and the seatback support 38. At least one light source 46 is disposed proximate the peripheral side ledges 16, the forward ledge 28, and the peripheral seatback cavity 40.

The advent of more efficient light sources, including light emitting diodes (LEDs), have given way to increased lighting both on in the interior and the exterior of automobiles. The use of LEDs and other high powered light sources can serve not only as an aesthetically pleasing design choice within vehicles, but also serve to communicate information at a glance to a driver or passenger. Traditionally, light sources that communicate information to a driver or a passenger are located in the dash or instrument panel of the vehicle. However, these notification centers can sometimes be overlooked or unnoticed, which could lead to undesirable circumstances for the driver or passenger. Accordingly, the use of an ambient seat lighting system 50 in or on the driver and passenger vehicle seating assembly 10 of a vehicle can relay status information regarding the vehicle and its many systems. More specifically, ambient seat lighting can be utilized to bring critical warning situations or critical driving conditions to the attention of a distracted driver or passenger during travel.

The decorative ambient seat lighting system 50 of the present disclosure is generally configured to provide a variety of functional lighting benefits to alert a distracted driver or passenger. As will be relayed in further detail herein, the ambient seat lighting can serve as a status or warning indicator that is activated immediately upon opening of a vehicle door, thereby alerting a vehicle user of a vehicle condition that may otherwise go unnoticed. Further, during travel, important notices, such as low fuel or high engine temperature, can be activated in the ambient seat lighting, bringing about a more noticeable alert to a driver. Further, in another embodiment, in the event a driver is distracted, the ambient seat lighting also is highly visible by passengers, both in the front passenger seat and the rear passenger seats. Consequently, passengers can notify the driver of a vehicle concern, in which case the driver can then consult the instrument panel for additional details on a potential vehicle problem.

With reference again to FIGS. 1-3, the vehicle seating assembly 10 generally includes a head restraint 52 supported on a head restraint support 54. The head restraint support 54 is operably coupled with a top portion of the seatback 30. It is also generally contemplated that lighting may be placed in or around the head restraint 52 to provide an indicator or alert to a driver or passengers. In one example, ambient lighting is placed on a bottom side of the head restraint 52 and directed downward such that a top portion of the seatback 30 is illuminated. Illumination of the upper portion 32 of the seatback 30 via the head restraint 52 can be used alone or combination with other lighting features of the vehicle seating assembly 10. In addition, as illustrated in FIG. 1, the vehicle seating assembly 10 is positioned on slide rails inside the vehicle. It will be understood that regardless of the position of the vehicle seating assembly 10 fore and after inside the vehicle, illumination of the vehicle seating assembly 10 or the various combinations of illuminated light sources will not differ. Further, it is contemplated that the rail slides may be illuminated by the various light sources positioned on the lower portion 34 of the vehicle seating assembly 10.

Although LEDs are generally disclosed herein as one light source, other light sources include incandescent bulbs, reflectorized incandescent bulbs, tungsten halogen incandescent bulbs, xenon rigid loop, festoon and wedge based bulbs, fluorescent bulbs, compact fluorescent lamps, and high intensity discharge bulbs may be utilized in the vehicle ambient seat lighting system 50. It will be also be understood that the various light sources that could be utilized may be capable of emitting different wavelengths of light, depending on the intended use.

Figure 4:
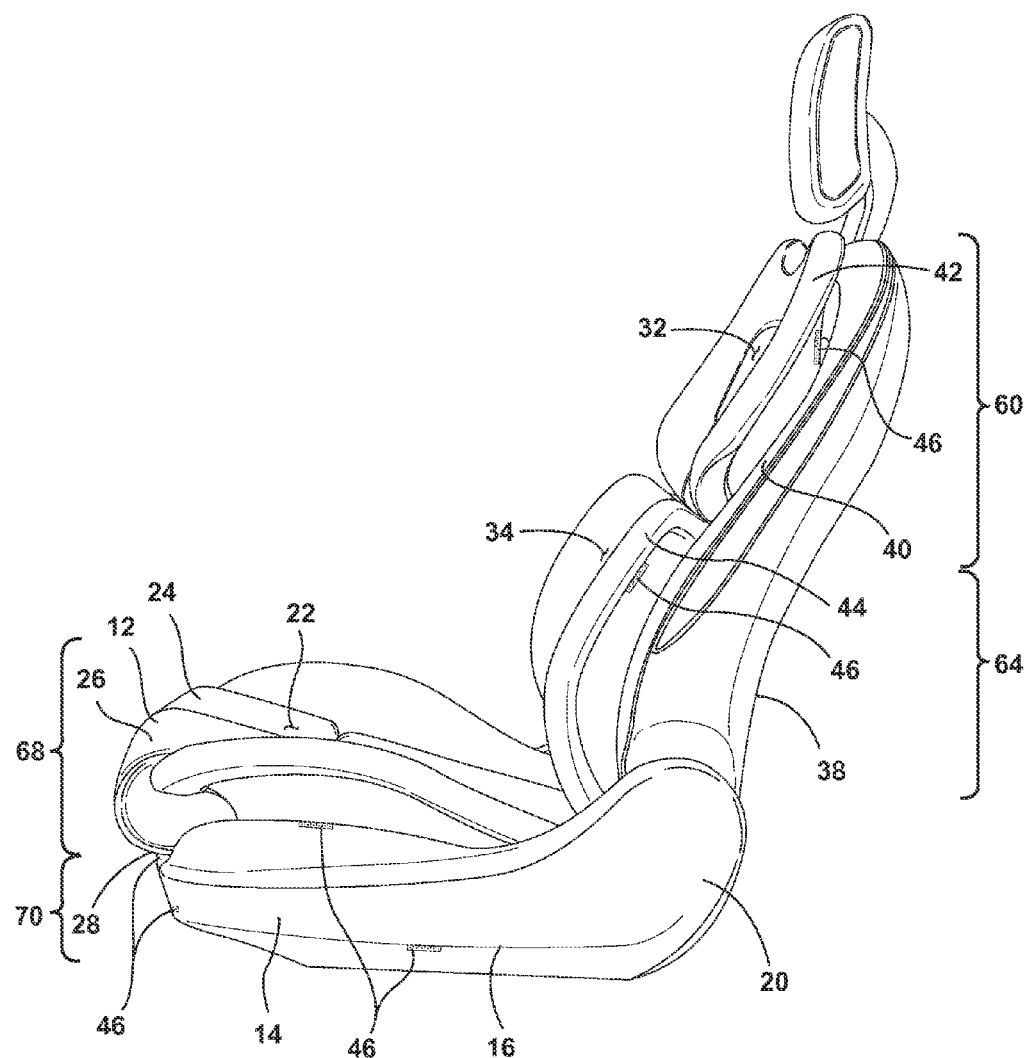
FIG. 4 is a side perspective view of the vehicle seating assembly of FIG. 1.
Figure 5:
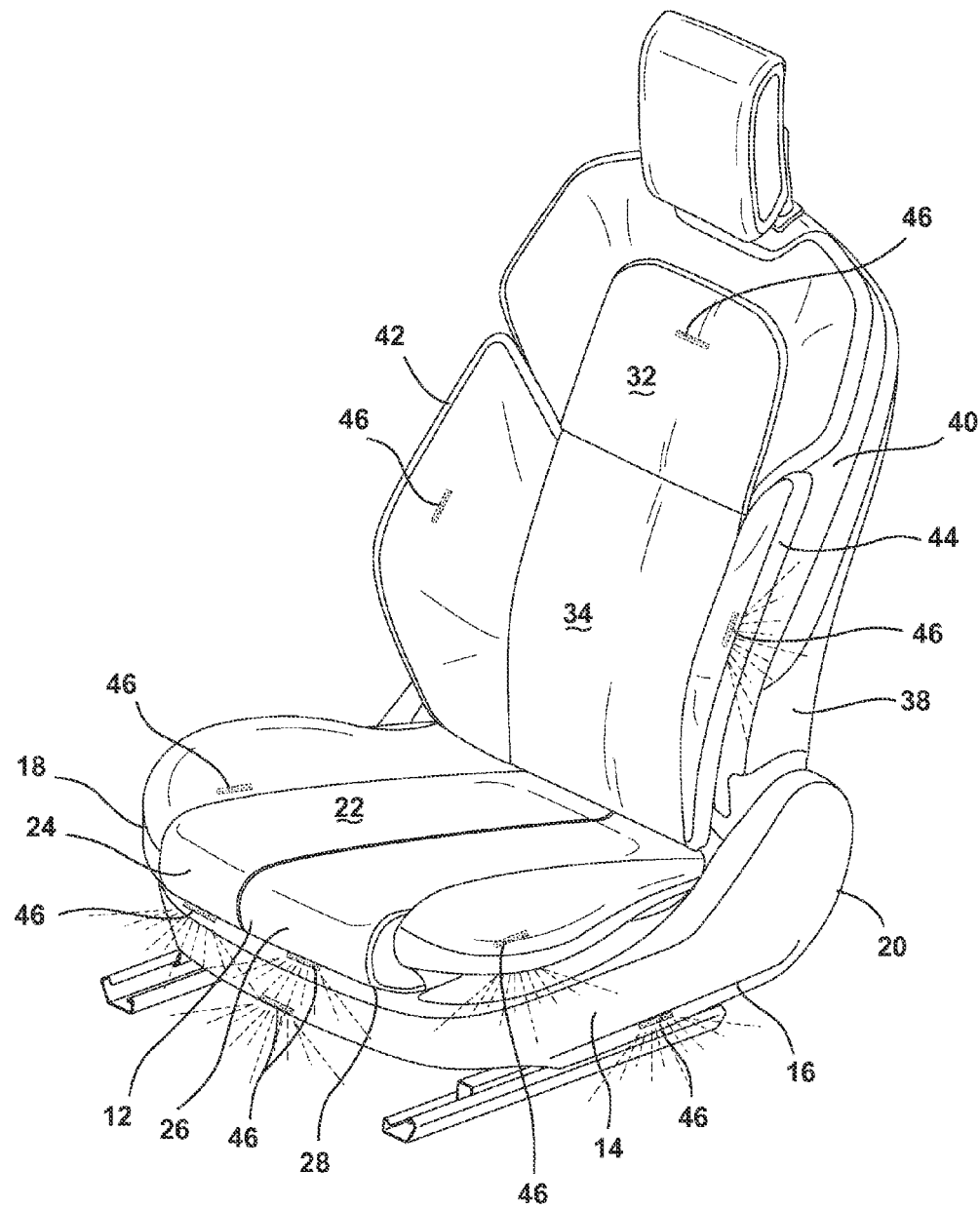
FIG. 5 is a front perspective view of another embodiment of a vehicle seating assembly of the present disclosure with an ambient seat lighting system enabled.
Figure 6:
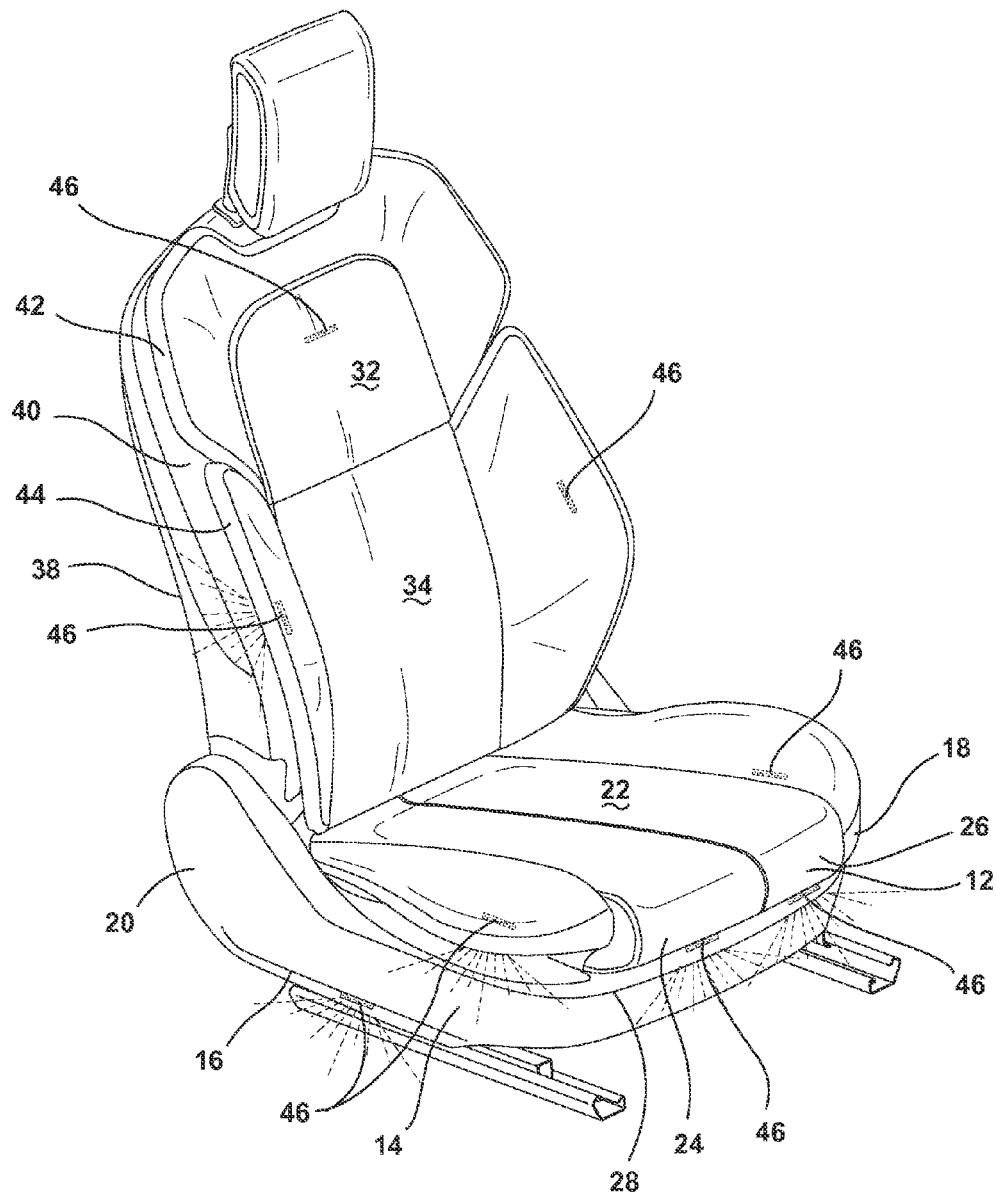
FIG. 6 is another front perspective view of the vehicle seating assembly of FIG. 5.
Figure 7:
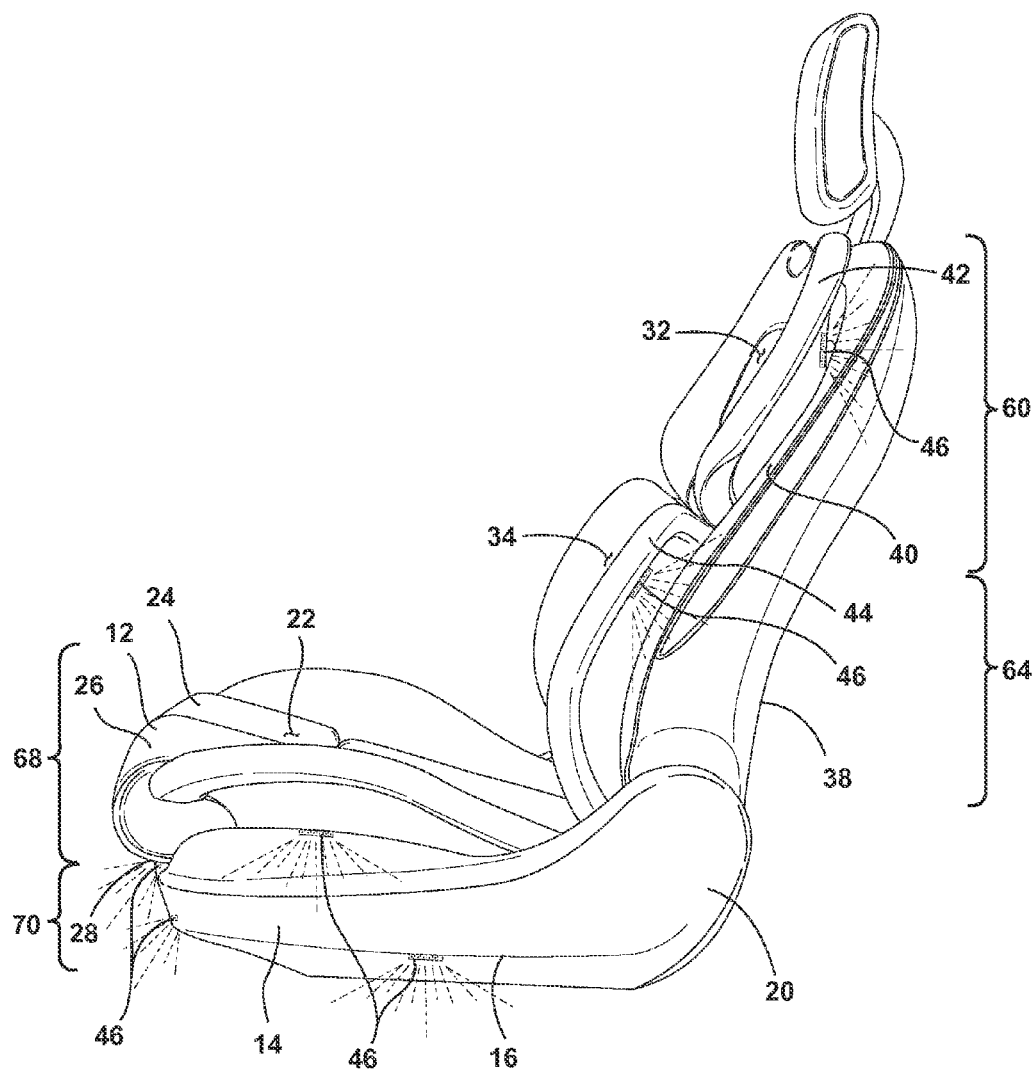
FIG. 7 is a side perspective view of the vehicle seating assembly of FIG. 5.

With reference to FIG. 4, it is also contemplated that various zones on the vehicle seating assembly 10 may be provided that can provide different information to a driver or a passenger. Specifically, the zones may include an upper zone 60 that includes an upper seatback, a mid-zone 64 that includes a lower seatback 66, a lower zone 68 that includes the seat 12 and a foot well zone 70, which illuminates a floor area of the vehicle proximate the seat 12. Depending on the intended message, a specific zone may be illuminated, or various groups of zones or all of the zones, may be illuminated. For example, when a user opens a vehicle door, all four zones 60, 64, 68, 70 may be set to illuminate a high intensity white wavelength to provide interior lighting to the vehicle. As a further example, once the door is closed, the upper zone 60 may fade to off, while the mid-zone 64, lower zone 68, and foot well zone 70 remain illuminated, thereby providing continued functional lighting for a passenger until ignition. It is contemplated that the illumination of the mid-zone 64, lower zone 68, and foot well zone 70 could be deactivated upon ignition or perhaps 30 seconds after door closure. Illumination of the mid-zone 64, lower zone 68, and foot well zone 70 may assist a user in locating objects inside the vehicle, such as car keys, prior to ignition of the vehicle. In another example, it is contemplated that the mid-zone 64, lower zone 68, and foot well zone 70 may fade to a low intensity white light for a period of 60 seconds after the door is closed, but with no key in the ignition, but with the key fob located in the vehicle. This low intensity white illumination that occurs 60 seconds after the door is closed may be maintained for any duration (e.g., 10 minutes). The low level ambient light indicates to a user that the vehicle is responsive and ready to start.

In yet another embodiment, upon vehicle ignition, the upper zone, mid-zone, lower zone, and foot well zone move to an ambient mode upon vehicle start to provide normal ambient lighting. In still another embodiment, upon activation of an alarm system by a key fob, when the vehicle is locked, the upper zone flashes a high intensity alert light (e.g., red), indicating to the person touching the outer door handle that the vehicle is locked and that the alarm is engaged.

Notably, the high intensity seat lighting, when activated, is very visible, even during daylight hours such that any warning indicator provided by the zones will not go unnoticed. In addition, any warning indicators that are relayed through the four zones will take precedence over normal ambient or otherwise non-warning type functional illumination. In addition, certain warnings, such as, for example, low fuel, will result in a bright red indicator each time the vehicle door is opened or closed, so that a driver or passenger is readily alerted that the vehicle is low on fuel. Accordingly, less aggressive or noticeable cues, such as a warning indicator on an instrument panel of the vehicle, which could possibly be accidentally overlooked, are complemented with the more aggressive visible cue on the vehicle seating assemblies 10 upon entering and exiting the vehicle.

It is generally contemplated that a variety of alerts may be displayed through the vehicle ambient seat lighting system 50. For example, whether a vehicle hazard switch is engaged, a turn signal has been engaged for a prolonged period of time, a check engine light is illuminated, an engine charging is activated, a low fuel indicator is activated, a door is ajar, and also to notify the driver or passenger that the lock/unlock function has been activated, or that a seat motor has stalled. This is an exemplary list and not intended to be comprehensive.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a seat including a base having peripheral side ledges disposed on first and second sides of the seat;
   a seat cushion disposed on the base and including first and second independent thigh supports that extend forwardly over the base and define a forward ledge;
   a seatback operably coupled to the seat and including an upper portion and a lower portion, wherein the lower portion includes a seatback cushion and a seatback support, and wherein a peripheral seatback cavity is located on first and second sides of the lower portion between the seatback cushion and the seatback support; and
   a plurality of zones defined on the seat and the seatback, each zone including at least one light source integrally formed in said vehicle seating assembly, wherein each zone is operationally independent and configured to relay information to a passenger.

2. The vehicle seating assembly of claim 1, wherein the at least one light source includes light emitting diodes.

3. The vehicle seating assembly of claim 1, wherein the upper portion of the seatback includes a seatback cushion and a seatback support, and wherein a peripheral seatback cavity is disposed between the seatback cushion and the seatback support.

4. The vehicle seating assembly of claim 1, wherein the at least one light source is configured to warn a driver of a critical driving condition.

5. The vehicle seating assembly of claim 4, wherein the at least one light source is configured to warn the driver of at least a vehicle hazard switch is engaged, a turn signal has been engaged for a prolonged period of time, a check engine light is engaged, a low fuel indicator is engaged, a door is ajar, a lock/unlock function is not performing, and a seat motor has stalled.

6. The vehicle seating assembly of claim 1, wherein the at least one light source is configured to emit different wavelengths of light.

7. A vehicle seating assembly comprising:
   a seat including a seat cushion and a base, wherein the seat cushion and the base define a peripheral seat ledge disposed on first and second sides of the seat and a front of the seat;
   a seatback operably coupled to the seat and including a seatback cushion and a seatback support, wherein a peripheral seatback cavity is located on first and second sides of the seatback and defined between the seatback cushion and the seatback support; and
   at least two operationally independent zones, each including at least one light source integrally formed within said vehicle seating assembly disposed proximate the peripheral seat ledge and the peripheral seatback cavity.

8. The vehicle seating assembly of claim 7, further comprising:
   first and second independent thigh supports that extend forwardly over the base.

9. The vehicle seating assembly of claim 7, wherein the at least one light source includes light emitting diodes.

10. The vehicle seating assembly of claim 7, wherein the seatback includes a seatback cushion and a seatback support, and wherein a peripheral seatback cavity is disposed between the seatback cushion and the seatback support at a central portion thereof.

11. The vehicle seating assembly of claim 7, wherein the at least one light source is configured to warn a driver of a critical driving condition.

12. The vehicle seating assembly of claim 11, wherein the at least one light source is configured to warn the driver of at least a vehicle hazard switch is engaged, a turn signal has been engaged for a prolonged period of time, a check engine light is engaged, a low fuel indicator is engaged, a door is ajar, a lock/unlock function is not performing, and a seat motor has stalled.

13. The vehicle seating assembly of claim 7, wherein the at least one light source is configured to emit different wavelengths of light.

14. A vehicle seating assembly comprising:
  a seat defining a peripheral seat ledge disposed on first, second, and front sides of the seat;
  a seatback operably coupled to the seat and including a seatback cushion and a seatback support and, a peripheral seatback cavity defined therebetween; and
  a light source disposed in a foot well zone below the seat and in independent seating zones in the peripheral seat ledge and peripheral seatback cavity.

15. The vehicle seating assembly of claim 14, further comprising:
  first and second independent thigh supports that extend forwardly over the base.

16. The vehicle seating assembly of claim 14, wherein the at least one light source includes light emitting diodes.

17. The vehicle seating assembly of claim 14, wherein the seatback includes a seatback cushion and a seatback support, and wherein a peripheral seatback cavity is disposed between the seatback cushion and the seatback support at a central portion thereof.

18. The vehicle seating assembly of claim 14, wherein the at least one light sources is configured to warn a driver of a critical driving condition.

19. The vehicle seating assembly of claim 18, wherein the at least one light source is configured to warn the driver of at least a vehicle hazard switch is engaged, a turn signal has been engaged for a prolonged period of time, a check engine light is engaged, a low fuel indicator is engaged, a door is ajar, a lock/unlock function is not performing, and a seat motor has stalled.

20. The vehicle seating assembly of claim 14, wherein the at least one light source is configured to emit different wavelengths of light.

* * * * *